(12) United States Patent
Ahrens-Botzong et al.

(10) Patent No.: US 7,237,383 B2
(45) Date of Patent: Jul. 3, 2007

(54) METHOD AND DEVICE FOR EXTRACTING WATER IN A POWER PLANT

(75) Inventors: Rudolf Ahrens-Botzong, Ludwigshafen (DE); Eberhard Gralla, Adelsdorf (DE); Dietmar Schmidt, Röttenbach (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 10/914,941

(22) Filed: Aug. 10, 2004

(65) Prior Publication Data

US 2005/0039461 A1 Feb. 24, 2005

(30) Foreign Application Priority Data

Aug. 13, 2003 (DE) ................. 103 37 240

(51) Int. Cl.
*F02C 7/00* (2006.01)
*F02C 7/141* (2006.01)

(52) U.S. Cl. ............. 60/775; 60/39.182; 60/39.5; 122/7 B

(58) Field of Classification Search ............ 60/39.182, 60/39.5, 775, 39.53; 122/7 R, 7 B
See application file for complete search history.

(56) References Cited

U.S. PATENT DOCUMENTS

| 4,246,072 A | * | 1/1981 | Brommel ............... 201/39 |
| 5,435,123 A | * | 7/1995 | Scholl et al. ............ 60/775 |
| 6,286,301 B1 | * | 9/2001 | Utamura ............. 60/39.53 |

FOREIGN PATENT DOCUMENTS

| DE | 42 27 146 A1 | 2/1994 |
| EP | 1 132 594 A1 | 9/2001 |
| FR | 2 334 825 A1 | 7/1977 |
| WO | WO 92/21859 | 12/1992 |

OTHER PUBLICATIONS

Database EPODOC, European Patent Office, The Hague, NL., and Abstract IT 1 256 878 B, Carrozzeria Bertone Spa, Dec. 27, 1995, p. 1, XP002309958.

* cited by examiner

*Primary Examiner*—Ted Kim

(57) ABSTRACT

A method according to the invention and a corresponding device (1) designed to cool the exhaust gas (15) of a gas turbine to below its dew point.

Water (25) accumulating hereby can be used for the power plant operation, so that the provision of (make-up) water for the power plant operation can be dispensed with or at least reduced, especially in areas ill-supplied with water.

8 Claims, 2 Drawing Sheets

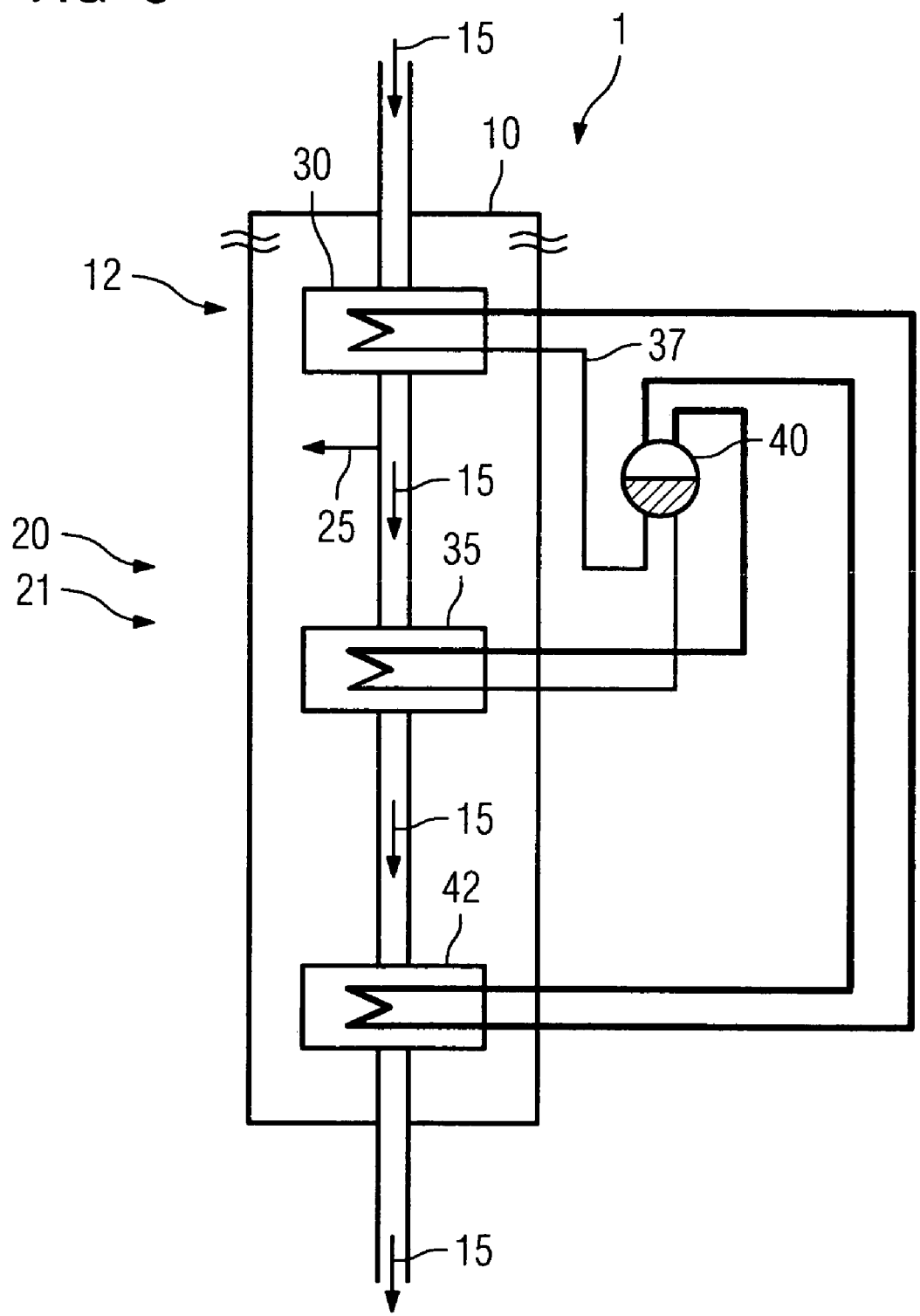

METHOD AND DEVICE FOR EXTRACTING WATER IN A POWER PLANT

CROSS REFERENCE TO RELATED APPLICATION

This application claims priority of the German application No. 10337240.7 DE filed Aug. 13, 2003, which is incorporated by reference herein in its entirety.

FIELD OF THE INVENTION

The invention relates to a method for extracting water in a power plant as well as an appropriate device.

BACKGROUND OF THE INVENTION

Water must be available for the operation of some components in a power plant. By way of example, in a steam electric power plant, a large quantity of water is required for the water-steam circuit in order to generate the necessary quantity of operating and auxiliary steam.

Further, a water reservoir must be replenished continuously during operation as the amount of water in the water-steam circuit decreases due to losses.

The provision or replenishment of water for power plants is, as a rule, easy to achieve in areas where there are adequate water sources or where a well developed supply system has been implemented.

By contrast, in regions ill supplied with water, the provision and maintenance of the amount of water necessary for the operation of the power plant is more problematic.

SUMMARY OF THE INVENTION

The object of the invention is therefore to propose a method and a device for extracting water in a power plant, which are particularly sparing of resources.

With respect to the method, the object of the invention is achieved by a method for extracting water in a power plant, comprising at least one gas turbine, whereby at least a part of the exhaust gas of the gas turbine is cooled below its dew point.

The invention is based on the idea that the waste product of a gas turbine, i.e. its exhaust gas flow, contains a determined water content. This moisture in the gas turbine exhaust gas is, according to the invention, separated by cooling the exhaust gas flow at least to below the dew point of the exhaust gas, which is, for example, in the region of 43° C., so that the water content in the exhaust gas precipitates and the water forming as a result can be separated and used for the power plant operation.

By means of the invention, a costly and possibly even environmentally damaging provision of water or make-up water for a power plant is dispensed with.

The power plant advantageously comprises a waste heat boiler, into which the exhaust gas of the gas turbine is fed.

As the exhaust gas of the gas turbine still exhibits a relatively large energy content due to its high temperature, this energy content can be used by means of a waste heat boiler in this form of embodiment, for example, to generate steam turbine operating steam or auxiliary steam for a range of other power plant components.

The cooling of the exhaust gas is preferably executed at the cold end of the waste heat boiler.

The cold end of the waste heat boiler is the area after which the exhaust gas is removed from the waste heat boiler. The hot exhaust gas has already passed through a stretch in the waste heat boiler, whereby it has emitted energy through heat exchange to, for example, heating surfaces and superheaters for generating steam.

In this form of embodiment, the exhaust gas is cooled to below its dew point before the being removed from the waste heat boiler, in order to separate the water content. As the cooling involves a drop in the energy content of the exhaust gas, in the present form of embodiment the cooling is only undertaken when the exhaust gas has already passed through the most significant part of its effective output stretch, during which the exhaust gas is used to generate steam by means of heat exchange. Furthermore, the resource requirement for the cooling of the exhaust gas is reduced, if, after leaving the gas turbine in the waste heat boiler, the exhaust gas is already cooled as a result of its being used to generate steam, so that the temperature difference to be overcome during cooling is reduced.

In an especially preferred embodiment of the invention, the exhaust gas is cooled by a heat pump.

A heat pump is a device by means of which energy is drawn from a flow medium by heat exchange. A coolant such as water is used, which absorbs the heat of the fluid medium and, for example, transfers it in a further heat exchange to a heating medium, e.g. water.

In this form of embodiment, the exhaust gas is fed into the heat pump, which transfers the heat content of the exhaust gas, at least in part, to a coolant and thus removes it from the exhaust gas flow, in order to achieve a temperature below that of the dew point of the exhaust gas.

The heat pump can thus comprise an evaporator and a condenser, the exhaust gas being cooled using the evaporator and subsequently heated using the condenser.

In this form of embodiment, the fluid medium, from which energy is to be drawn and the heating medium, to which energy is to be supplied, are identical and formed by the exhaust gas flow. The exhaust gas is initially cooled below its dew point using the evaporator of the heat pump so that the water generated thereby can be separated and the previously cooled exhaust gas flow is subsequently reheated.

In this form of embodiment, after leaving the waste heat boiler, the exhaust gas exhibits once again a temperature above its dew point, which is particularly advantageous for downstream pollution treatment measures that may have to be implemented.

Before the exhaust gas is fed to the evaporator, the exhaust gas has, for example, a temperature of approximately 98° C., and is cooled by the evaporator to a temperature of approximately 40° C., whereby the water content in the exhaust gas is separated, and the exhaust gas is subsequently reheated by means of the condenser to approximately 90° C.

The power plant is advantageously designed as a gas and steam electric power plant.

These types of power plants demonstrate a particularly high degree of efficiency.

The invention relates further to a device for extracting water in a power plant, comprising at least one gas turbine, whereby at least one heat exchange device is provided, by means of which at least one part of the exhaust gas of the gas turbine can be cooled below its dew point.

The power plant advantageously comprises a waste heat boiler, into which the exhaust gas of the gas turbine can be fed.

The heat exchange device is preferably arranged at the cold end of the waste heat boiler.

In an especially preferred form of embodiment, the heat exchange device comprises a heat pump.

The heat pump preferably comprises an evaporator and a condenser, the exhaust gas being cooled by means of the evaporator and subsequently heated using the condenser.

Advantageously, the power plant is designed as a gas and steam electric power plant.

BRIEF DESCRIPTION OF THE DRAWINGS

Three exemplary embodiments of the invention are represented in more detail below. The figures show:

FIG. 1 a device for extracting water in a power plant with a heat exchange device, FIG. 2 a device according to the invention with a heat pump, comprising an evaporator and a condenser, and FIG. 3 a further device according to the invention with a heat pump, whereby a further heating surface for additional reheating of the exhaust gas flow is provided for.

FIG. 1 shows a schematic representation of a device 1 according to the invention comprising a waste heat boiler 10, into which exhaust gas 15 of a gas turbine is fed.

DETAILED DESCRIPTION OF INVENTION

Figure 2:
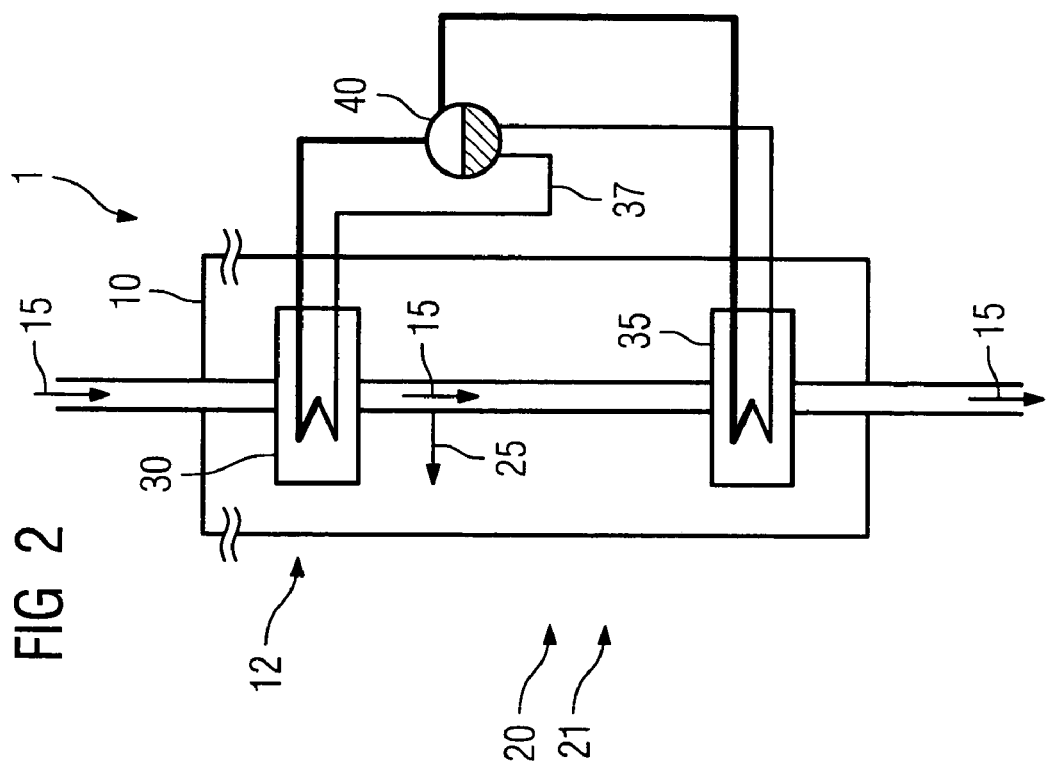
Figure 1:
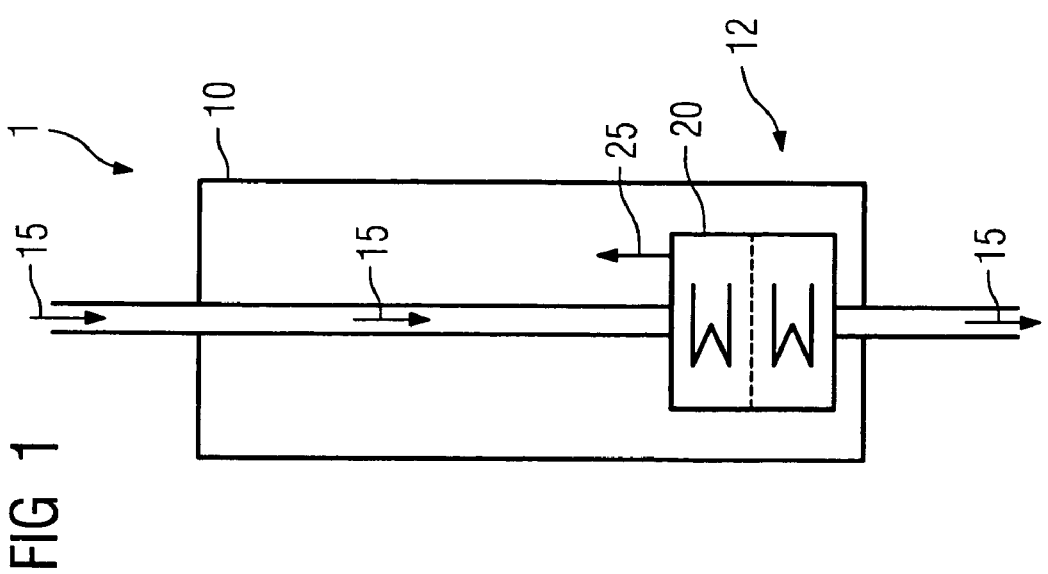

A heat exchange device 20 is arranged at the cold end 12 of the waste heat boiler 10, and is used to cool the exhaust gas 15 below the dew point of the exhaust gas 15. Heating surfaces can be arranged in the flow direction of the exhaust gas 15 before the heat exchange device 20 (not illustrated), to draw energy from the exhaust gas 15 in order, for example, to generate steam turbine operating steam.

When the exhaust gas 15 is cooled below its dew point, the moisture contained in the exhaust gas 15 precipitates and can be removed as water 25 and used for the power plant operation, to provide make-up water for example.

After the exhaust gas 15 has been cooled it can be removed from the heat boiler 10.

FIG. 2 shows a further device 1 according to the invention whereby the heat exchange device 20 is designed as a heat pump 21, comprising an evaporator 30 and a condenser 35.

The heat pump 21 is arranged once again at the cold end 12 of the waste heat boiler 10.

The exhaust gas 15 of the gas turbine is fed into the waste heat boiler 10 and cooled by the evaporator 30 below the dew point of the exhaust gas 15, in particular below 43° C.

A coolant 37 is passed through the evaporator 30, said coolant being vaporized as a result of the heat exchange with the exhaust gas 15, and collected in a steam drum 40, and returned to the evaporator 30. By means of the cooling of the exhaust gas 15 using the evaporator 30, the moisture contained in the exhaust gas 15 is separated as water 25, which can be used for the power plant operation.

The exhaust gas 15 is reheated after being cooled and the water 25 contained therein is separated in the condenser 35, thus the exhaust gas 15 leaving the waste heat boiler 10 has a temperature above the dew point of the exhaust gas 15, so that any measures implemented in order to reduce pollutants in exhaust gas 15 are facilitated.

By way of example, the exhaust gas 15 has a temperature of 98° C. before contact with the evaporator 30. The exhaust gas 15 is then cooled by an evaporator 30 to a temperature of 40° C., for example, (the dew point of the exhaust gas 15 is approximately 43° C.) and after the water 25 has been separated, the exhaust gas 15, which now has a temperature of approximately 40° C., is reheated by the condenser 35 to a temperature of approximately 90° C., and thereafter removed from the waste heat boiler 10.

The reheating of the exhaust gas 15 by the condenser 35 can be achieved, for example, by feeding the hot steam generated during the cooling of the exhaust gas 15 by means of the evaporator 30 and collected in the steam drum 40 to the condenser 35 as heating medium, this steam being heated up through the heat exchange with the cooled exhaust gas, liquefied and fed back to the steam drum 40.

In FIG. 3 shows a schematic representation of a further device 1 according to the invention, which essentially comprises the same function as the form of embodiment according to FIG. 2. Additionally a heating surface 42 is provided to further heat the reheated steam 15 after condenser 35. By way of example, the heating surface 42 can be supplied with steam generated by the evaporator 30, said steam being directed back to the steam drum 40 after its heat exchange with the exhaust gas 15 in the heating surface 42.

The invention can be summarised as follows:

A method according to the invention and a corresponding device designed to cool the exhaust gas of a gas turbine below its dew point.

Water accumulating hereby can then be used for the power plant operation, thus the provision of (make-up) water for the power plant operation can be dispensed with or at least reduced, in particular in areas ill-supplied with water. The exhaust gas is cooled preferably at the cold end of a waste heat boiler in the power plant, whereby a heat pump is preferably used to cool the exhaust gas.

The heat pump can comprise an evaporator for cooling the exhaust gas and separating the water content in the exhaust gas as well as a condenser for the subsequent reheating of the exhaust gas.

The invention claimed is:

1. A method for extracting water in a power plant having a gas turbine, comprising:
   releasing exhaust gas from the gas turbine;
   supplying the released exhaust gas to a heat exchanger arranged in a waste heat boiler;
   cooling a portion of the released exhaust flow below a dew point of the exhaust gas;
   condensing the released exhaust gas that is below the dew point to form a volume of condensed water; and
   separating the volume of condensed water in the waste heat boiler and recirculating the condensed water in the power plant,
   wherein the released exhaust gas is cooled by a heat pump, and
   wherein the heat pump comprises an evaporator for cooling the released exhaust gas and a condenser for subsequently heating the exhaust gas.

2. The method according to claim 1, wherein a portion of the released exhaust gas is provided to the heat exchanger.

3. The method according to claim 1, wherein the heat exchanger is arranged near the cold end of the waste heat boiler.

4. The method according to claim 3, wherein the released exhaust gas is cooled at the cold end of the waste heat boiler.

5. The method according to claim 1, wherein the power plant is designed as a gas and steam electric power plant.

6. A device for extracting water in a power plant having a gas turbine,
- a waste heat boiler having a cold end; and
- a heat exchanger device, arranged within the waste heat boiler, that accepts an exhaust gas from the gas turbine and cools a portion of the exhaust gas below its dew point,
- wherein the heat exchanger device comprises a heat pump, and
- wherein the heat pump comprises an evaporator that cools the exhaust gas and a condenser that subsequently heats the exhaust gas.

7. The device according to claim 6, wherein the heat exchanger device is arranged at the cold end of the waste heat boiler.

8. The device according to claim 6, wherein the power plant is designed as a gas and steam electric power plant.

* * * * *